(12) United States Patent
Takahama

(10) Patent No.: US 11,145,032 B2
(45) Date of Patent: Oct. 12, 2021

(54) IMAGE PROCESSING APPARATUS, METHOD AND STORAGE MEDIUM FOR REDUCING COLOR NOISE AND FALSE COLOR

(71) Applicant: CANON KABUSHIKI KAISHA, Tokyo (JP)

(72) Inventor: Atsushi Takahama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 160 days.

(21) Appl. No.: 16/598,075

(22) Filed: Oct. 10, 2019

(65) Prior Publication Data
US 2020/0118250 A1 Apr. 16, 2020

(30) Foreign Application Priority Data
Oct. 12, 2018 (JP) .............................. JP2018-193515

(51) Int. Cl.
| | |
|---|---|
| *G06T 5/00* | (2006.01) |
| *G06T 7/90* | (2017.01) |
| *H04N 5/357* | (2011.01) |
| *G06T 11/00* | (2006.01) |

(52) U.S. Cl.
CPC ................ *G06T 5/002* (2013.01); *G06T 7/90* (2017.01); *G06T 11/001* (2013.01); *H04N 5/357* (2013.01)

(58) Field of Classification Search
CPC ......... G06T 5/002; G06T 7/90; G06T 11/001; G06T 2207/10024; G06T 2207/20016; H04N 5/357
See application file for complete search history.

(56) References Cited

U.S. PATENT DOCUMENTS

| | | | |
|---|---|---|---|
| 9,911,060 B2 | 3/2018 | Takahama | |
| 2004/0252907 A1* | 12/2004 | Ito | H04N 1/58 382/260 |

(Continued)

OTHER PUBLICATIONS

Malini et al. ("Image Denoising Using Multiresolution Analysis and Nonlinear Filtering," Fifth International Conference on Advances in Computing and Communications, Sep. 2-4, 2015) (Year: 2015).*
Lu et al. ("Multiresolution nonlocal means method for image denoising," International Conference on Intelligent Control and Information Processing, Aug. 13-15, 2010) (Year: 2010).*

(Continued)

*Primary Examiner* — Yubin Hung
(74) *Attorney, Agent, or Firm* — Carter, DeLuca & Farrell LLP

(57) ABSTRACT

A noise reduction unit reduces color noise of an input image to generate a noise-reduced image. A first generation unit generates a color difference signal from the noise-reduced image. A reduction processing unit generates hierarchical images including at least two or more reduced images from the noise-reduced image. A second generation unit generates coloring-suppressed color difference signals from the reduced images. A combining unit combines the color difference signal generated by the first generation unit with each of the color difference signals generated by the second generation unit. The second generation unit selects one of the color difference signals of the reduced images for each pixel based on magnitude of each of the color difference signals of the reduced images, to generate the coloring-suppressed color difference signals.

16 Claims, 13 Drawing Sheets

(56) References Cited

U.S. PATENT DOCUMENTS

| | | | | |
|---|---|---|---|---|
| 2008/0253678 A1* | 10/2008 | Li | ................... | H04N 19/33 |
| | | | | 382/260 |
| 2010/0182462 A1* | 7/2010 | Utsugi | ................ | H04N 5/357 |
| | | | | 348/241 |
| 2011/0013039 A1* | 1/2011 | Aisaka | ............... | H04N 5/2351 |
| | | | | 348/222.1 |
| 2011/0268368 A1* | 11/2011 | Toyoda | ................ | G06T 5/002 |
| | | | | 382/264 |
| 2013/0063623 A1* | 3/2013 | Kawaguchi | ....... | H04N 9/04557 |
| | | | | 348/224.1 |
| 2013/0071025 A1* | 3/2013 | Jang | ................ | H04N 9/04517 |
| | | | | 382/167 |
| 2019/0164258 A1 | 5/2019 | Takahama | | |
| 2019/0295225 A1* | 9/2019 | Saito | ................... | G06T 5/10 |

OTHER PUBLICATIONS

Sugitha et al. ("Performance analysis of multiresolution image denoising schemes," International Conference on Communication Control and Computing Technologies, Oct. 7-9, 2010) (Year: 2010).*

C. Tomasi, et al.: "Bilateral Filtering for Gray and Color Images", Sixth International Conference on Computer Vision, IEEE, 1998, pp. 839-846.

M. Lebrun, et al.: "A Nonlocal Bayesian Image Denoising Algorithm", SIAM Journal on Imaging Science, 2013, vol. 6, No. 3, pp. 1665-1688.

M. Lebrun, et al.: "Implementation of the 'Non-Local Bayes' (NL-Bayes) Image Denoising Algorithm", Image Processing On Line, 3 (2013), pp. 1-42.

* cited by examiner

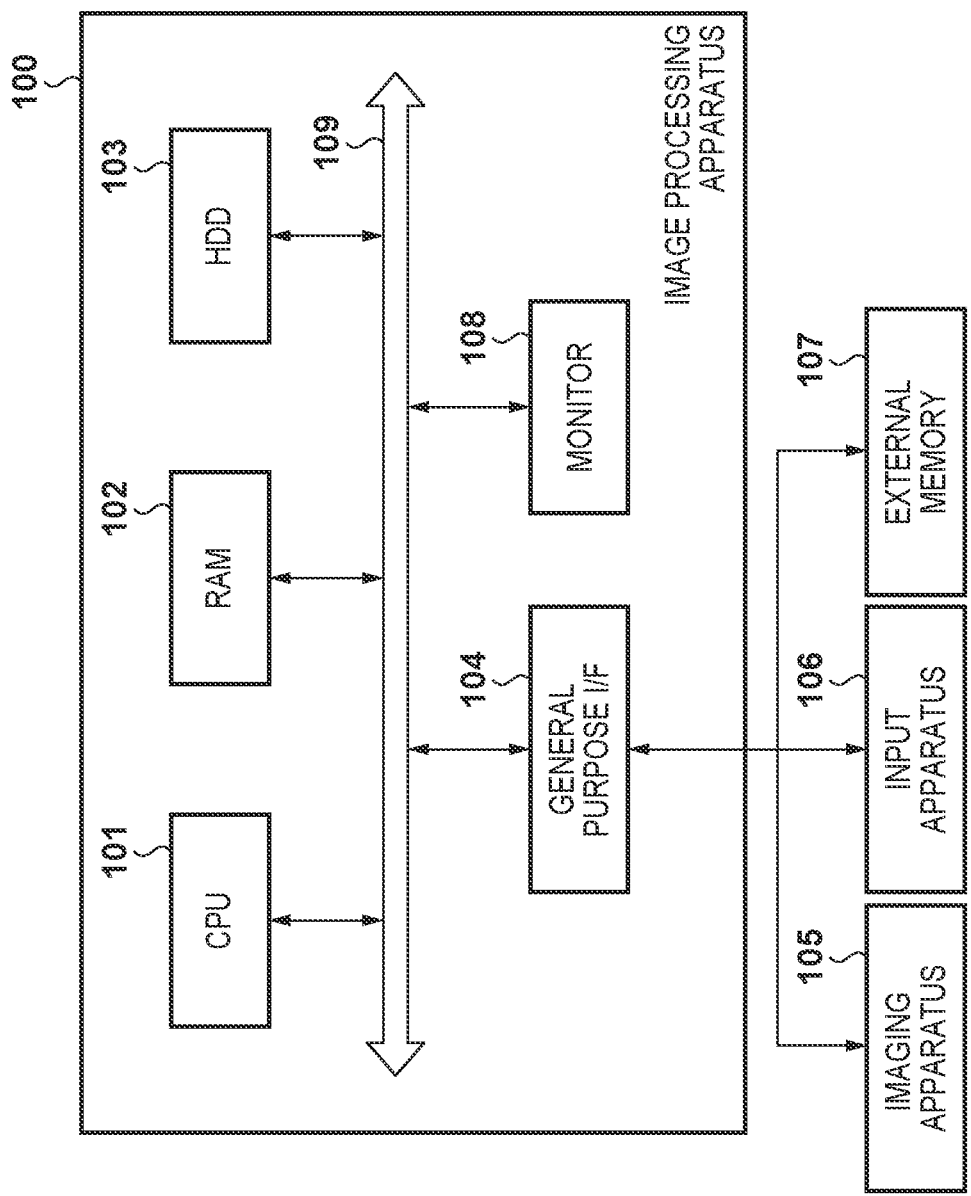

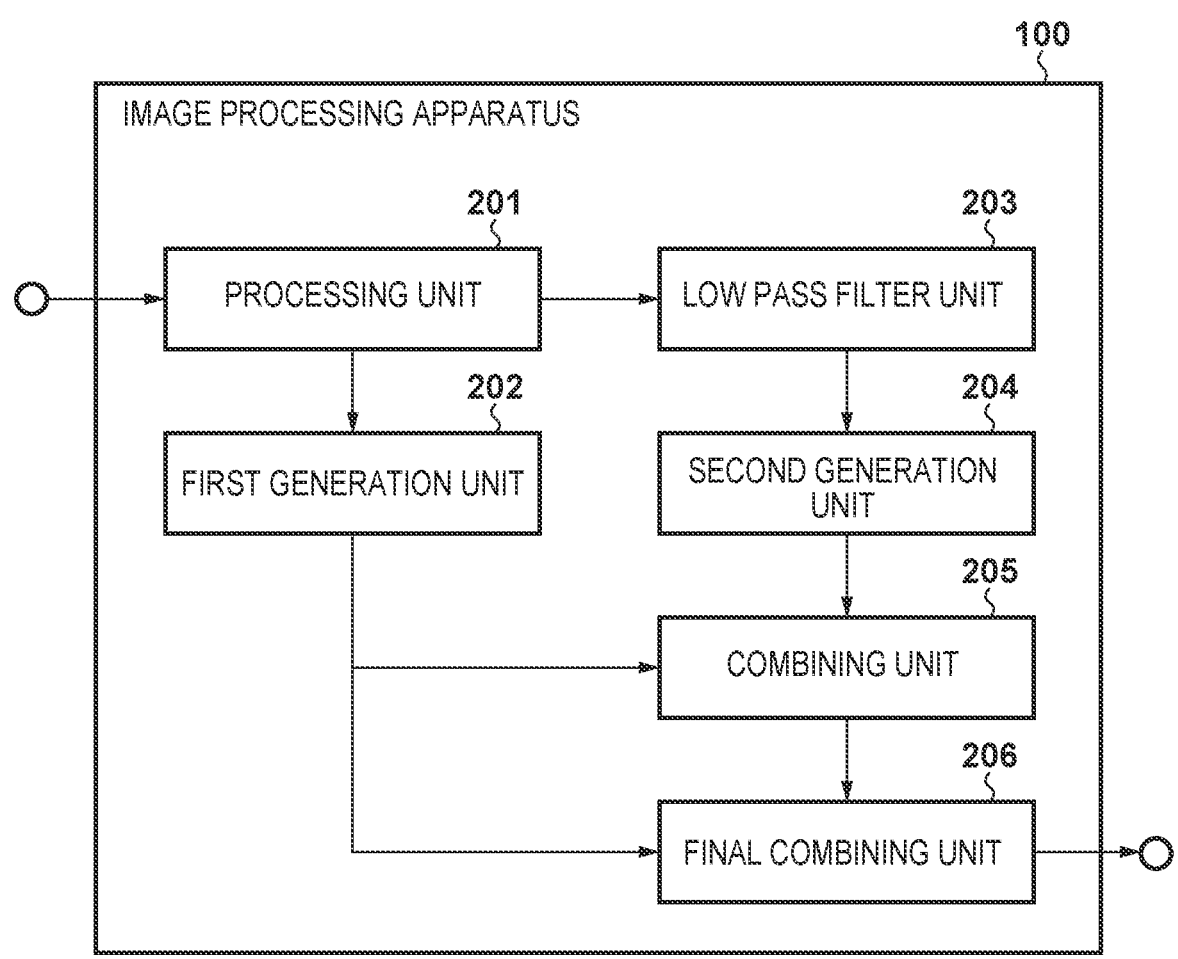

FIG. 3A
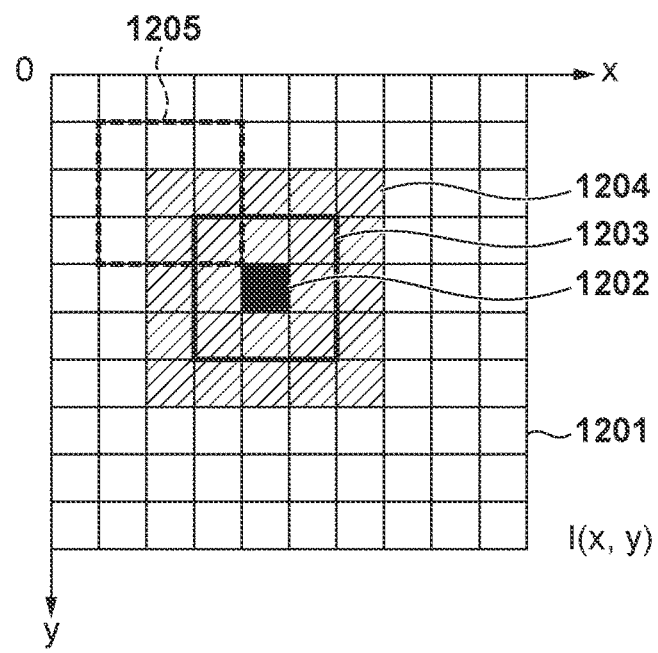
FIG. 3B
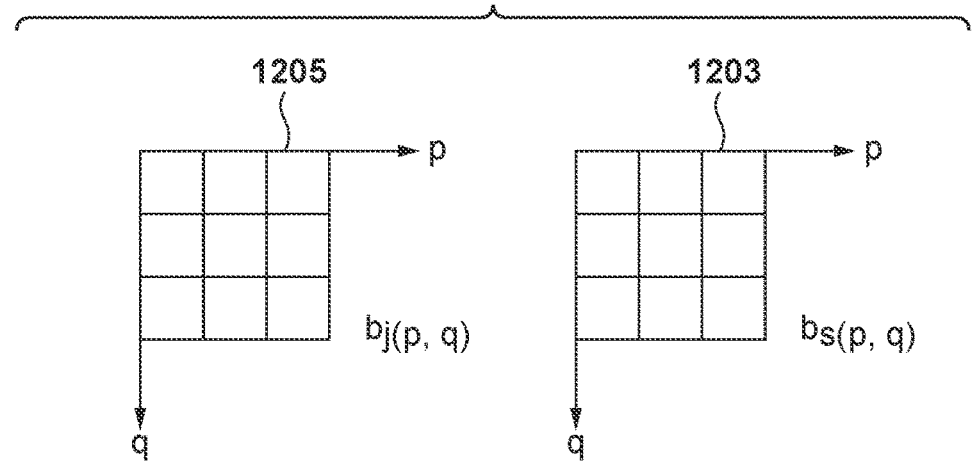
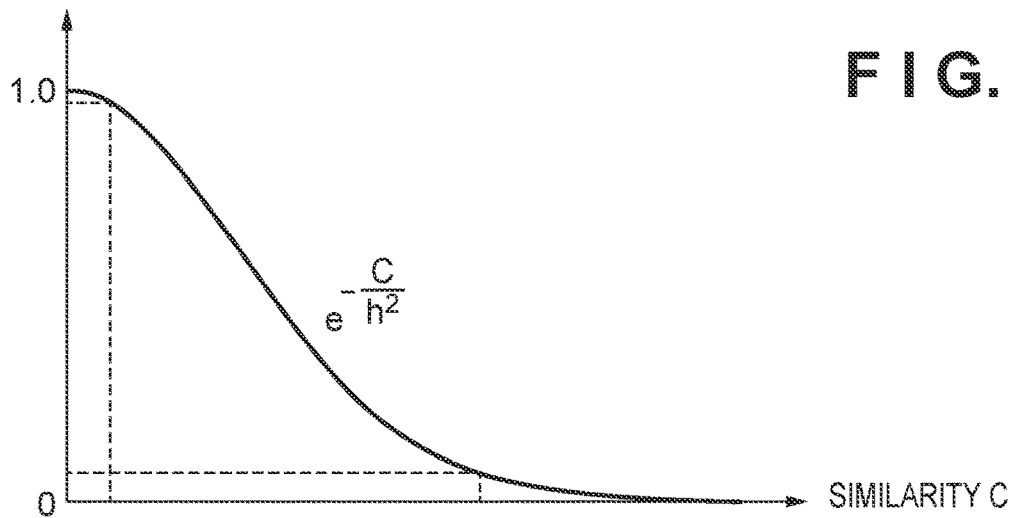
FIG. 4

IMAGE PROCESSING APPARATUS, METHOD AND STORAGE MEDIUM FOR REDUCING COLOR NOISE AND FALSE COLOR

BACKGROUND OF THE INVENTION

Field of the Invention

The present invention relates to a technique for reducing color noise and coloring (false color).

Description of the Related Art

A digital imaging apparatus such as a digital camera converts light received by a light charge conversion element (imaging element) such as a CCD or a CMOS sensor into a digital signal to generate digital image data. In the process of generating digital image data, dark current noise, thermal noise, shot noise and the like are generated due to characteristics of the imaging element and circuits, and mixed into the digital image data. Recently, the pixel pitch has been minimized along with the miniaturization of the imaging element and an increase in the number of pixels. As a result, noise is easily noticeable, and especially when the imaging sensitivity is increased, noise is significantly generated, largely contributing deterioration of image quality. Therefore, to obtain a high-quality image, it is necessary to reduce mixed noise, and many techniques for reducing such noise are known. Among the techniques, the edge-preserving smoothing filtering typified by Bilateral filtering for gray and color images, Sixth International Conference on Computer Vision, 1998 (pp. 839-846), IEEE. has been widely used. In addition, A non-local Bayesian image denoising algorithm, SIAM Journal on Imaging Science, 2013., Implementation of the "Non-Local Bayes" (NL-Bayes) Image Denoising Algorithm, Image Processing On Line, 3 (2013) (NL Bayesian Method) discloses a method of generating a patch set from a captured image, applying noise reduction processing to all patches belonging to the patch set, and further combining these patches to generate a denoised image. As compared with the edge preserving smoothing filter, the patch-based noise reduction method including the Non-local Bayesian image denoising algorithm, SIAM Journal on Imaging Science, 2013. Implementation of the "Non-Local Bayesian" (NL-Bayes) Image Denoising Algorithm, Image Processing On Line, 3 (2013) (NL Bayesian Method) can further reduce only noise with high accuracy without blurring edges and texture as much as possible.

Even if the edge preserving smoothing filter or the patch-based noise reduction method is used, noise cannot be reduced with high accuracy in an area where there are few similar patterns in the surroundings. As a result, coloring (false color) image quality problems occur mainly in a high frequency region.

SUMMARY OF THE INVENTION

The present invention provides a technique of effectively reducing color noise and coloring (false color) generated mainly in a high frequency region.

According to the first aspect of the present invention, there is provided an image processing apparatus comprising: a noise reduction unit configured to reduce color noise of an input image to generate a noise-reduced image; a first generation unit configured to generate a color difference signal from the noise-reduced image; a reduction processing unit configured to generate hierarchical images including at least two or more reduced images from the noise-reduced image; a second generation unit configured to generate coloring-suppressed color difference signals from the reduced images; and a combining unit configured to combine the color difference signal generated by the first generation unit with each of the color difference signals generated by the second generation unit, wherein the second generation unit selects one of the color difference signals of the reduced images for each pixel based on magnitude of each of the color difference signals of the reduced images, to generate the coloring-suppressed color difference signals.

According to the second aspect of the present invention, there is provided an image processing method comprising: reducing color noise of an input image to generate a noise-reduced image; performing a first generation to generate a color difference signal from the noise-reduced image; generating hierarchical images including at least two or more reduced images from the noise-reduced image; performing a second generation to generate coloring-suppressed color difference signals from the reduced images; and combining the color difference signal generated in the first generation and each of the color difference signals generated in the second generation, wherein in the second generation one of the color difference signals of the reduced images for each pixel is selected based on magnitude of each of the color difference signals of the reduced images, to generate the coloring-suppressed color difference signals.

According to the third aspect of the present invention, there is provided a non-transitory computer-readable storage medium storing a computer program that causes a computer to function as: a noise reduction unit configured to reduce color noise of an input image to generate a noise-reduced image; a first generation unit configured to generate a color difference signal from the noise-reduced image; a reduction processing unit configured to generate hierarchical images including at least two or more reduced images from the noise-reduced image; a second generation unit that generates coloring-suppressed color difference signals from the reduced images; and a combining unit configured to combine the color difference signal generated by the first generation unit with each of the color difference signals generated by the second generation unit, wherein the second generation unit selects one of the color difference signals of the reduced images for each pixel based on magnitude of each of the color difference signals of the reduced images, to generate the coloring-suppressed color difference signals.

Further features of the present invention will become apparent from the following description of exemplary embodiments (with reference to the attached drawings).

BRIEF DESCRIPTION OF THE DRAWINGS

FIG. 1 is a block diagram illustrating an exemplary hardware configuration of an image processing apparatus 100.

FIG. 2 is a block diagram illustrating an exemplary functional configuration of the image processing apparatus 100.

FIGS. 3A and 3B are diagrams illustrating a method of determining the weight of a reference pixel.

FIG. 4 is a diagram illustrating a method of determining the weight of reference pixel.

DESCRIPTION OF THE EMBODIMENTS

Figure 5:
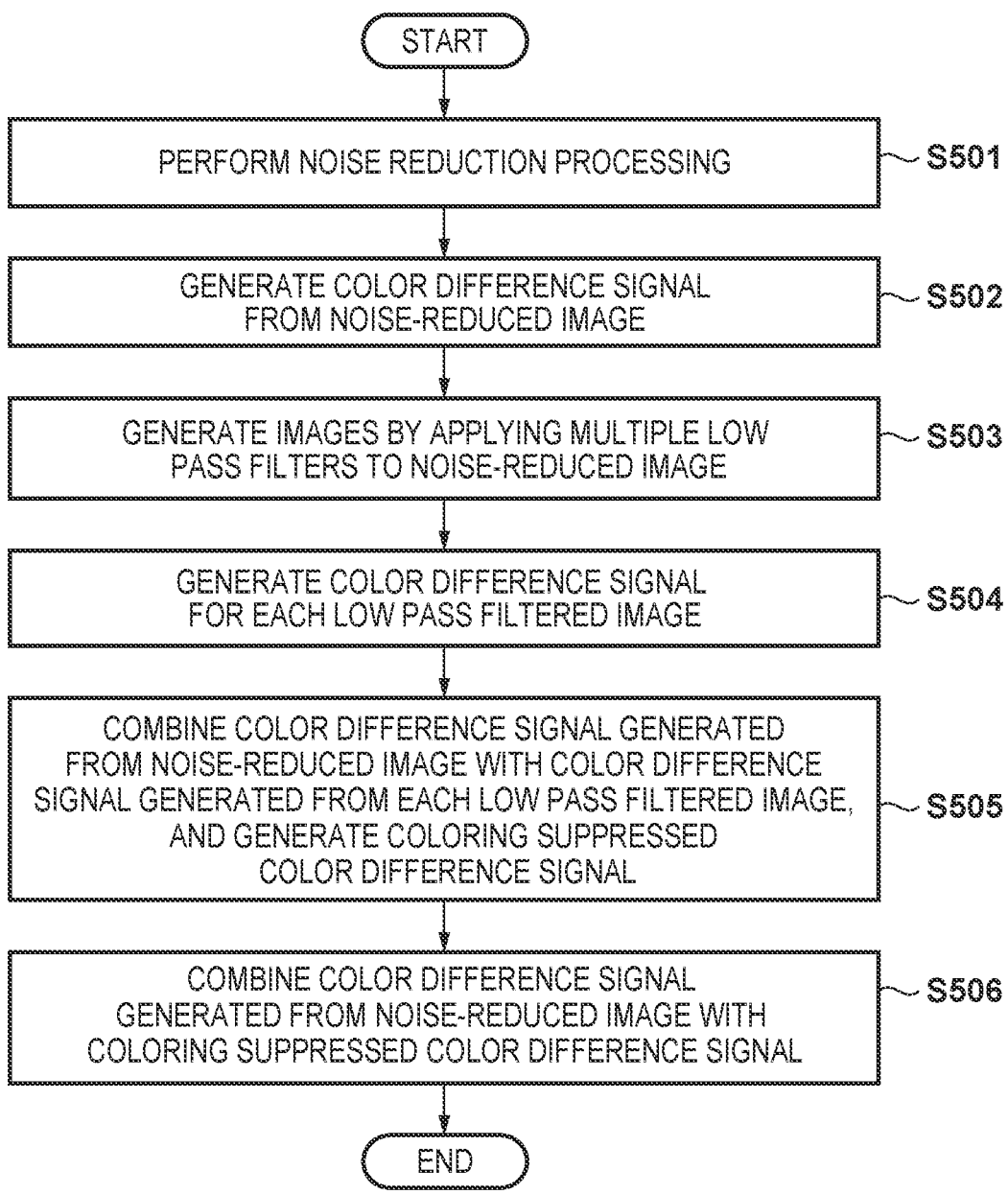
FIG. 5 is a flowchart of processing of reducing color noise and coloring (false color) in a high frequency region.

Embodiments of the invention are described below with reference to the accompanying drawings. Note that the embodiments described below represent an example of a specific implementation of the present invention, which is one of the specific examples of the configuration described in the claims.

First Embodiment (Exemplary Hardware Configuration of Image Processing Apparatus)

The exemplary hardware configuration of an image processing apparatus 100 according to the present embodiment is described using a block diagram of FIG. 1. The hardware configuration of the image processing apparatus 100 is an example, and may be changed/modified as appropriate.

A CPU 101 executes various processing using computer programs and data stored in a RAM 102. Thus, the CPU 101 controls the operation of the entire image processing apparatus 100 as well as executes or controls each processing described later to be executed by the image processing apparatus 100.

The RAM 102 has an area for storing computer programs and data loaded from an HDD (hard disk drive) 103 and data received from the outside via a general-purpose I/F (interface) 104. The RAM 102 also includes a work area used when the CPU 101 executes various processing. In this way, the RAM 102 may provide various areas as appropriate.

The HDD 103 stores computer programs and data for allowing the CPU 101 to execute and control each processing described below to be executed by an operating system (OS) or the image processing apparatus 100. The computer programs stored in the HDD 103 includes computer programs for causing the CPU 101 to execute functions of each functional unit described as functional units of the image processing apparatus 100 in the following description. The data stored in the HDD 103 includes information (previously set information, previously acquired information, and the like) described as known information in the following description. The computer programs and data stored in the HDD 103 are loaded into the RAM 102 as appropriate according to the control of the CPU 101, to be processed by the CPU 101.

An imaging apparatus 105, an input apparatus 106, and an external memory 107 are connected to the general-purpose I/F 104. The general-purpose I/F 104 is configured of one or more connection interfaces, and is used to connect various equipment including the imaging apparatus 105, the input apparatus 106, and the external memory 107 to the image processing apparatus 100.

The imaging apparatus 105 is a digital imaging apparatus that converts light received by a light charge conversion element (imaging element) such as a CCD or CMOS sensor into a digital signal to generate digital image data, and outputs the generated digital image data to the image processing apparatus 100. The CPU 101 acquires (stores) the digital image data received from the imaging apparatus 105 via the general-purpose I/F 104 as an input image in the RAM 102 or the HDD 103.

The input apparatus 106, which is configured of a user interface such as a keyboard, mouse, touch panel, or the like, enables the user to input various commands to the CPU 101.

The external memory 107 such as an SD card or a USB memory is a memory apparatus that is removable from the image processing apparatus 100. An input image to be processed by the image processing apparatus 100 may be acquired from the imaging apparatus 105, may be acquired from the HDD 103, or may be acquired from the external memory 107. The input image to be processed by the image processing apparatus 100 may be also acquired from another apparatus, for example, an external server apparatus via a wired and/or wireless network.

A monitor 108 is configured of a liquid crystal screen or the like, and enables displaying the processing result of the CPU 101 in the form of an image, text, or the like. The input apparatus 106 and the monitor 108 may be integrated to constitute a touch panel screen. The CPU 101, the RAM 102, the HDD 103, the general-purpose I/F 104, and the monitor 108 are all connected to a bus 109.

In the present embodiment, in the image processing apparatus 100, in response to an instruction from the CPU 101, an image is inputted to an image processing application to output an image with color noise and coloring (false color) reduced in a high frequency region.

(Non-Local Means)

First, noise reduction processing described in the present embodiment is described. In the present embodiment, a Non-Local Means method is used. In this method, adaptive weighting is applied to the pixel values of a plurality of reference pixels existing around and including a target pixel to be subjected to the noise reduction processing, and the pixel value of the target pixel is replaced with a value acquired by summing the weighted values to reduce noise. Assume that the number of the reference pixels is $N_S$, the pixel value of the reference pixel is $I_j$ (j=1 to $N_S$), and the weight of the reference pixel is $w_j$ (j=1 to $N_S$). At this time, the weighted average pixel value $I_{new}$ of the target pixel subjected to the noise reduction processing may be found according to Equation (1) below.

$$I_{new} = \frac{\sum_{j=1}^{N_S} w_j \times I_j}{\sum_{j=1}^{N_S} w_j} \quad (1)$$

Next, a method of determining the weight of the reference pixel is described with reference to FIGS. 3A, 3B and FIG. 4. In FIG. 3A, 1201 illustrates an example of image data, and given that the pixel position at the upper left corner is an origin (0, 0), the pixel value of the pixel at the pixel position (x, y) is represented as I(x, y). Here, 1202 illustrates a target pixel, and its pixel value is I (4, 4). 1203 illustrates a target area, which is a rectangular area of 3×3 pixels centered on the target pixel 1202 to be subjected to the noise reduction processing. 1204 illustrates reference pixels, which are pixels in a rectangular area of 5×5 pixels ($N_S$=25) including the target pixel 1202. 1205 illustrates a reference area for the reference pixel (the pixel at the pixel position (2, 2)), which is a rectangular area (reference area) of 3×3 pixels centered on the reference pixel (the pixel at the pixel position (2, 2)) having the same size as the target area 1203. It is noted that although the reference area is present for each reference pixel, for the sake of explanation, only the reference area corresponding to the reference pixel (the pixel at the pixel position (2, 2)) is illustrated.

To find the weight of the reference pixel (the pixel at the pixel position (2, 2)), first, the target area 1203 is compared with the reference area 1205 to find a similarity. There are various methods of determining the similarity, and the method is not limited to a specific method. For example, as illustrated in FIG. 3B, assume that the pixel value at the pixel position (p, q) in the target area 1203 is $b_s$ (p, q), and the pixel value at the pixel position (p, q) in the reference area 1205 is $b_j$ (p, q) (j=1 to $N_S$). Then, assuming that a difference between pixel values in the target area 1203 and the reference area 1205, which spatially correspond to each other, is the similarity $C_j$, the similarity $C_j$ can be found by calculating Equation (2) below.

$$C_j = \sum_p \sum_q (b_j(p, q) - b_s(p, q))^2 \quad (2)$$

The smaller the value of the similarity $C_j$, the higher the similarity between the target area 1203 and the reference area 1205. Then, the weight is determined according to the similarity $C_j$. As in the function illustrated in FIG. 4, the weight may be determined such that the weight W is larger as the similarity C is smaller and the weight W is smaller as the similarity C is larger. For example, the weight can be found by calculating Equation (3) below.

$$w_j = \exp\left(-\frac{C_j}{h^2}\right) \quad (3)$$

Here, h is a variable that controls the magnitude of the weight, and the weight $w_j$ is larger as h increases. Therefore, if h is increased, the effect of the noise reduction processing is enhanced, but the edge is blurred.

Likewise, the weight for each reference pixel can be obtained by sequentially comparing the target area 1203 with the reference area of each reference pixel. In addition, the noise reduction processing in the present embodiment is not limited to the Non-Local Means method described here.

(Exemplary Functional Configuration of Image Processing Apparatus)

Next, an exemplary functional configuration of the processing of reducing color noise and coloring (false color) in a high frequency region of the image processing apparatus 100 according to the present embodiment is described with reference to a block diagram of FIG. 2. The configuration illustrated in FIG. 2 can be modified/changed as appropriate. For example, one functional unit may be divided into a plurality of functional units by function, or two or more functional units may be integrated into one functional unit. Further, the configuration illustrated in FIG. 2 may be configured of two or more apparatuses. In this case, the apparatuses are interconnected via a circuit or a wired or wireless network, and operate in coordination with each other via data communication to achieve each processing described later to be executed by the image processing apparatus 100. The same applies to FIGS. 6, 7, 8 and 9 described below.

In the following, the functional units illustrated in FIGS. 2, 6, 7, 8, and 9 may be described as main entity for processing, but in practice, the CPU 101 executes the computer program corresponding to each functional unit, thereby achieving the function of each functional unit. The functional units illustrated in FIGS. 2, 6, 7, 8, and 9 may be implemented by hardware.

Input images inputted from the imaging apparatus 105, the HDD 103, the external memory 107, or the like is inputted to a processing unit 201. The input image may be a RAW image, an RGB 3ch image, or an RG1G2B 4ch image. The present embodiment is described on the assumption that the input image processed by the processing unit 201 is a 4ch image acquired by 2×2 binning of a RAW image in Bayer arrangement. Note that "2×2 binning" is processing of regarding four adjacent RG1G2B pixels of a RAW image as information about one pixel. Here, since the image is treated as a 4ch image, the resolution is cut in half, but the amount of information is the same as that of the unprocessed RAW image. Also, as a matter of course, 2×2 binning may be performed before or after the processing of the processing unit 201. Furthermore, since the present embodiment is applicable if RGB information is present in one pixel, and the RAW image is not necessarily subjected to 2×2 binning and may be subjected to any other suitable interpolation processing.

The processing unit 201 applies the noise reduction processing to the input image by the Non-Local Means method, thereby generating and outputting a noise-reduced image which is a processed input image. Here, the noise reduction processing does not necessarily use the Non-Local Means method, and may use an edge preserving smoothing filter such as a bilateral filter. However, the method of comparing with a block including surrounding pixel values in the target area, such as the Non-Local Means method, has a larger advantageous effect than the method of comparing with the pixel value of only the target pixel.

A first generation unit 202 generates a color difference signal (color difference information) from the noise-reduced image. Here, when luminance G instead of luminance Y is used as simplified luminance because the human has a relative luminosity function that green light is most bright, the color difference signal is found by Cr=R−G and Cb=B−G. At this time, the G signals are classified into two types of G1 and G2, and G1 and G2 are averaged to bring a signal Gmix=(G1+G2)/2. Then, the color difference signal calculated using the G signals is defined as represented by Equation (4) below.

$cr_{g1}$=R−G1

$cb_{g1}$=R−G1

$cr_{g2}$=R−G2

$$cb_{g2}=R-G2$$

$$cr_{mix}=R-G\text{mix}$$

$$cb_{mix}=B-G\text{mix} \quad (4)$$

Then, as represented by Equation (5) below, the color difference signal having a minimum color difference magnitude is adopted.

$$cr_{min}=\min(|cr_{g1}|,|cr_{g2}|,|cr_{mix}|)$$

$$cb_{min}=\min(|cb_{g1}|,|cb_{g2}|,|cb_{mix}|) \quad (5)$$

As a matter of course, the method of finding the color difference signal is not limited to this. When the noise-reduced image is an RGB 3ch, the values of cr=R−G and cb=B−G may be used.

A low pass filter unit 203 applies a low-pass filter to the noise-reduced image outputted from the processing unit 201 based on a plurality of previously defined low pass filter coefficients (number of taps), and outputs the results. At this time, it is necessary to define the low-pass filter coefficients having different frequency characteristics. This is due to that the optimal low-pass filter characteristic for producing a coloring-suppressed signal varies depending on the target area and a subject around the target area. Therefore, depending on the degree of coloring of the image to be processed and the desired degree of suppression, it is desirable to prepare more types of low-pass filters. However, it is possible to implement the present embodiment even with at least one low-pass filter. It is noted that the color difference signal generated by the first generation unit 202 may be low-pass filtered, in which case processing of a second generation unit 204 is skipped.

The second generation unit 204 generates a color difference signal for each noise-reduced image (a noise-reduced image low-pass filtered based on the corresponding low-pass filter coefficient) outputted from the low pass filter unit 203. To generate the color difference signal, the second generation unit calculates $Cr_{min}$ and $Cb_{min}$ according to Equations (4) and (5) as in the first generation unit 202. However, in the second generation unit 204, as represented by Equation (6) below, when the signs of $Cr_{min}$ and $Cr_{mix}$ are inverted, the adopted color difference $Cr_{min}$ may be set to 0. The same applies to the Cb signal. Equation (6) may not necessarily be applied, but can enhance the effect of suppressing coloring.

$$\text{if } (cr_{mix}\cdot cr_{min}<0) \; cr_{min}=0$$

$$\text{if } (cb_{mix}\cdot cb_{min}<0) \; cb_{min}=0 \quad (6)$$

The combining unit 205 compares the color difference signal generated by the first generation unit 202 with the color difference signal generated by the second generation unit 204 and combines the color difference signals to generate a coloring-suppressed color difference signal. Specifically, assuming that the color difference signal generated by the first generation unit 202 is $Cr_1$ and $Cb_1$ and the color difference signals generated by the second generation unit 204 are $Cr_{2 \, to \, 3}$ and $Cb_{2 \, to \, 3}$, first, color difference magnitude cd is calculated according to Equation (7) below. Here, the magnitude of the color difference is not necessarily calculated according to Equation (7), and may be calculated by the sum of absolute values rather than the sum of squares. Further, since the magnitude of the color difference corresponds to the magnitude of saturation, other methods of calculating the saturation may be used.

$$cd_1=cr_1^2+cb_1^2$$

$$cd_2=cr_2^2+cb_2^2$$

$$cd_3=cr_3^2+cb_3^2 \quad (7)$$

Then, $cd_1$, $cd_2$ and $cd_3$ are compared with one another, and the Cr and Cb signals corresponding to the smallest color difference magnitude are taken as the combining result. Here, the reason for combining the color difference signals including ones generated by the first generation unit 202, which is not low-pass filtered, is that even an uncolored area may be colored via the low-pass filter. A final combining unit 206 uses the color difference signal generated by the combining unit 205 in only the area to be coloring-suppressed. However, areas adjacent to the colored area are often detected as the colored area. Thus, the color difference signal generated by the first generation unit 202 is adopted for the uncolored area.

The final combining unit 206 combines the color difference signal generated by the first generation unit 202 and the color difference signal generated by the combining unit 205 based on information about an area to be coloring-suppressed. Specifically, the color difference signal generated by the first generation unit 202 may be replaced with the color difference signal generated by the combining unit 205 in only the area to be coloring-suppressed. For the information about an area to be coloring-suppressed, for example, a known high frequency region detection technique may be used. As a result, coloring can be suppressed by successfully blurring only the noticeable colored area without deteriorating the color resolution of the entire image. When it is desired to limit a portion to be coloring-suppressed, for example, color information may be combined, and conversely, when it is desired to increase the suppression area, an edge determination result may be used.

(Main Processing Flow)

Next, the processing of reducing color noise and coloring (false color) in a high frequency region of the image processing apparatus 100 is described with reference to a flowchart in FIG. 5. As described above, mainly the CPU 101 executes each processing step in the flowchart in FIG. 5.

In Step S501, the noise reduction processing is applied to an input image by, for example, the Non-Local Means method to generate a noise-reduced image, and the noise-reduced image is outputted. In Step S502, a color difference signal is generated from the noise-reduced image outputted in Step S501.

In Step S503, the noise-reduced image outputted in Step S501 is low-pass filtered. Here, a plurality of low-pass filter coefficients (the number of taps) having different frequency characteristics are previously defined. That is, in Step S503, the noise-reduced image is filtered with the low-pass filter coefficients (the number of taps) to generate a plurality of images.

In Step S504, a color difference signal is generated for each of the plurality of low-pass filtered noise-reduced images generated in Step S503. In Step S505, the color difference signal generated in Step S502 is combined with the color difference signal generated in Step S504 to generate a coloring suppressed color difference signal.

In Step S506, the color difference signal generated in Step S502 is combined with the color difference signal generated in Step S505 based on information about area to be coloring-suppressed. Specifically, the color difference signal generated in Step S502 is replaced with the color difference signal generated in Step S505 in only the area to be coloring-suppressed.

As described above, according to the present embodiment, coloring in the image subjected to the noise reduction processing can be suppressed, thereby acquiring an image with color noise and coloring (false color) in a high frequency region effectively reduced, without deteriorating the color resolution of the entire image.

Second Embodiment

In the following, a difference between a second embodiment and the first embodiment is described, and it is assumed that the second embodiment is the same as the first embodiment unless otherwise specified. In the present embodiment, color noise and coloring (false color) are reduced more effectively using the NL Bayes method as one of patch-based NR methods for the noise reduction processing, which is different from the method in the first embodiment.

(Summary of Processing Using NL Bayes Method)

First, noise reduction processing using the NL Bayes method as one of the patch-based noise reduction methods in the present embodiment, is described. First, a plurality of pixels in the input image is set as target pixels, and a patch set is generated for each target pixel. Next, noise of each patch included in the generated patch set is reduced. First, an average value of the pixels in the patch, and a covariance matrix of totaling products of any two pixel values for each patch among all patches included in the patch set are calculated. A prior probability followed by the pixel values of an ideal image without noise is modelled (assumed) using the average value and the covariance matrix. Next, the pixel values of the patch that maximizes the posterior probability are determined using the Bayes' theorem represented by "posterior probability=likelihood×prior probability". That is, the modeled prior probability and previously measured image noise variance corresponding to the likelihood (based on the imaging sensor of the camera) are applied to the Bayes' theorem to determine the pixel values of each patch so as to maximize the posterior probability. This results in noise-reduced patches. Then, the noise-reduced patches are combined to generate a noise-reduced output image. This patch combining processing is referred to as aggregation or the like. Specifically, each noise-reduced patch is returned to the original patch position in the input image, and pixels where a plurality of patches overlap are averaged or weight-averaged based on similarity. The above is the contents of the noise reduction processing using the NL Bayes method.

In the present embodiment, first, the above-described noise reduction processing using the NL Bayes method is performed to generate a color noise-reduced image. Then, a color noise reduction signal with coloring (false color) occurring in a high frequency region of the color noise-reduced image reduced is generated based on the color noise-reduced image and similar patch information in the noise reduction processing using the NL Bayes method.

Definition of Terms

Here, terms in the present embodiment are described. The "patch" means a rectangular area corresponding to a portion of an input image, and is configured of a plurality of pixels. Hereinafter, the patch configured of a plurality of pixels based on a target pixel among pixels in the input image as a reference is referred to as a "target patch". A patch set around the target patch, which is referred to a noise reduction on the target patch, is referred to as a "reference patch". The reference patch is a patch configured of a plurality of pixels based on the reference pixels. Since a plurality of reference pixels are set for one target pixel, a plurality of reference patches is present for one target pixel. The above-described patch set is a set of the target patch and the reference patch (similar patch) having high similarity to the target patch among the plurality of reference patches.

(Exemplary Functional Configuration of Image Processing Apparatus)

Figure 6:
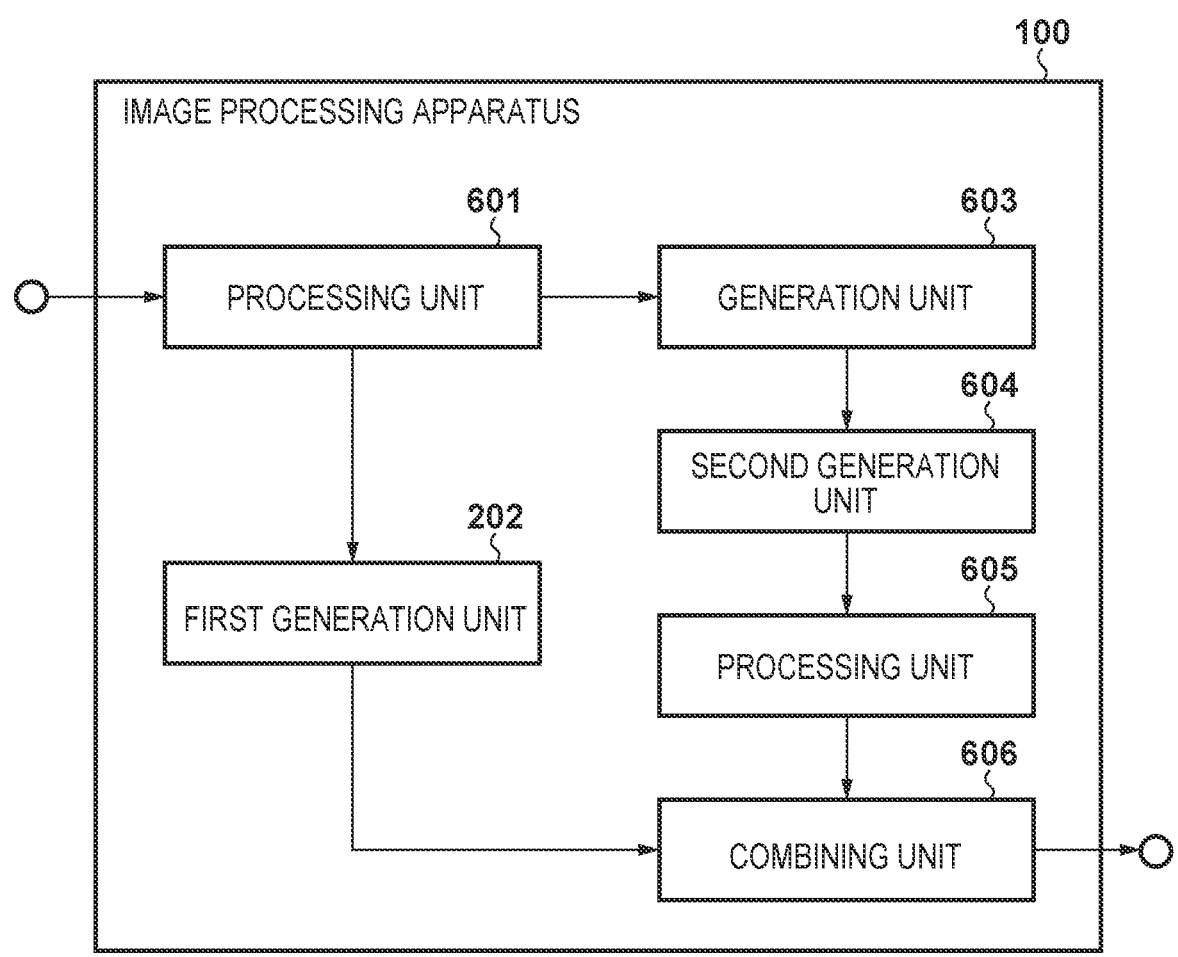
FIG. 6 is a block diagram illustrating an exemplary functional configuration of the image processing apparatus 100.
Figure 7:
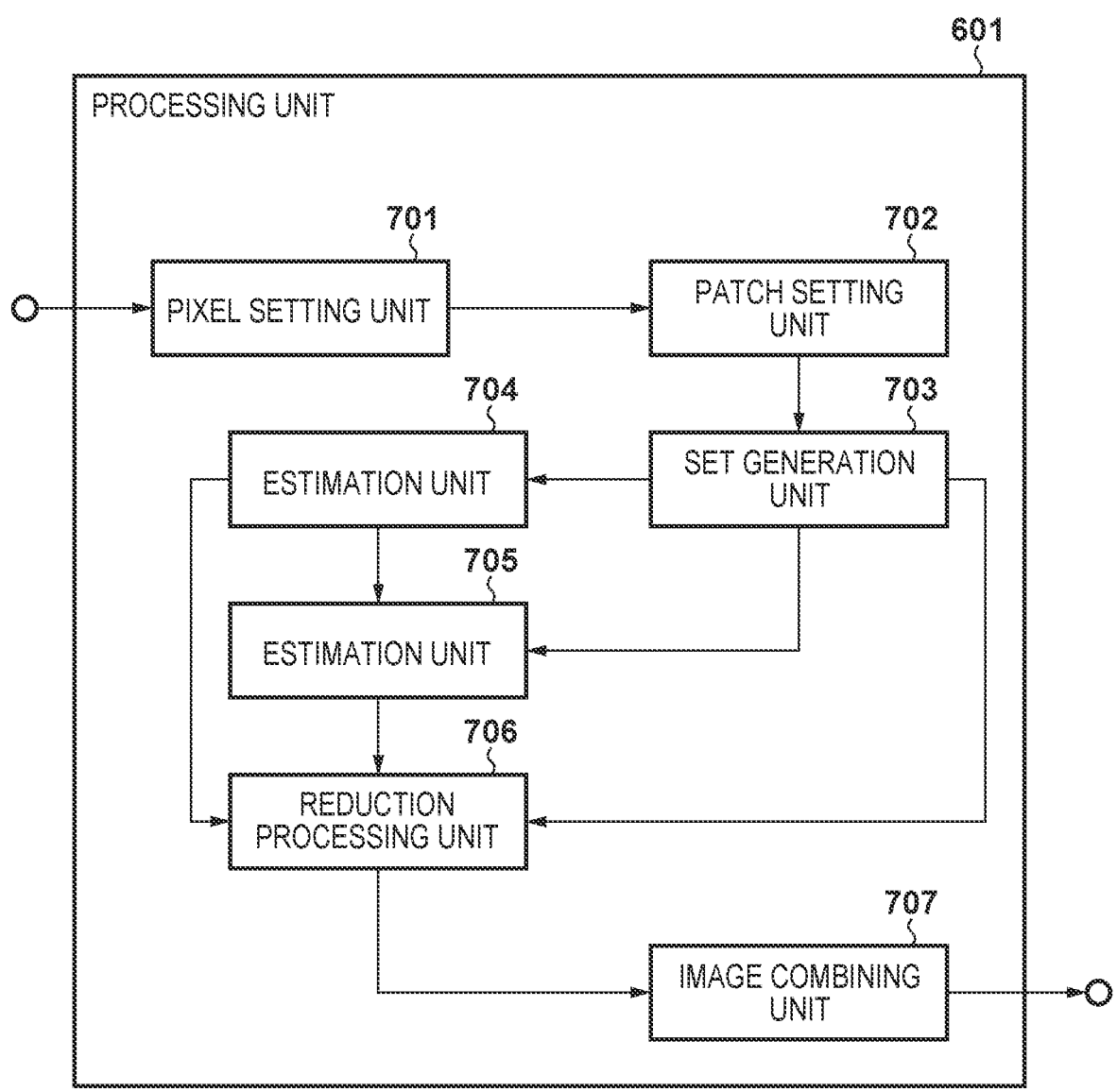
FIG. 7 is a block diagram illustrating details of an exemplary functional configuration of a processing unit 601.
Figure 8:
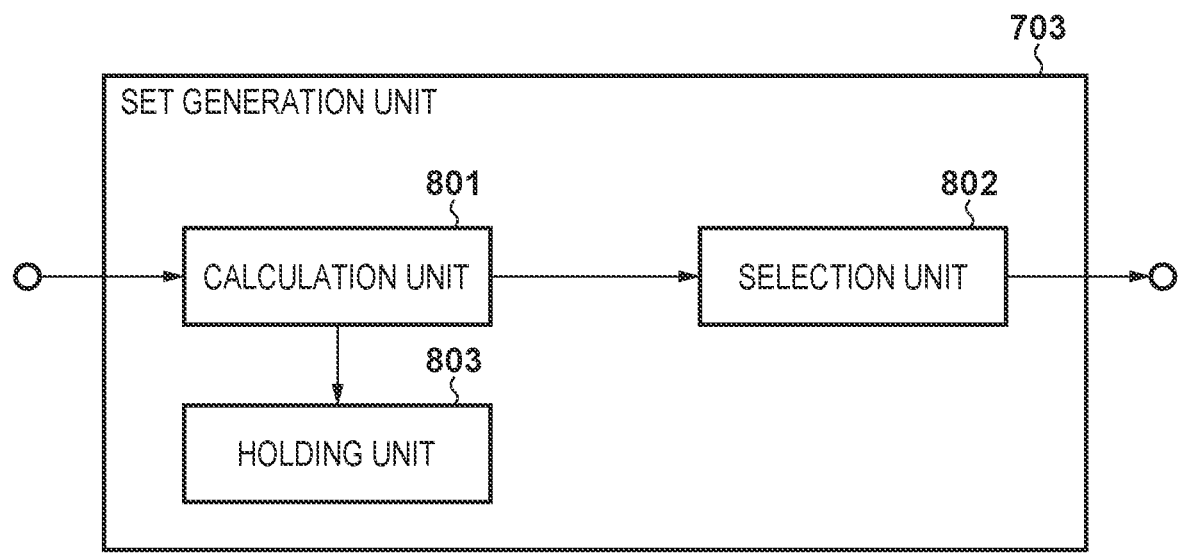
FIG. 8 is a block diagram illustrating details of an exemplary functional configuration of a set generation unit 703.
Figure 9:
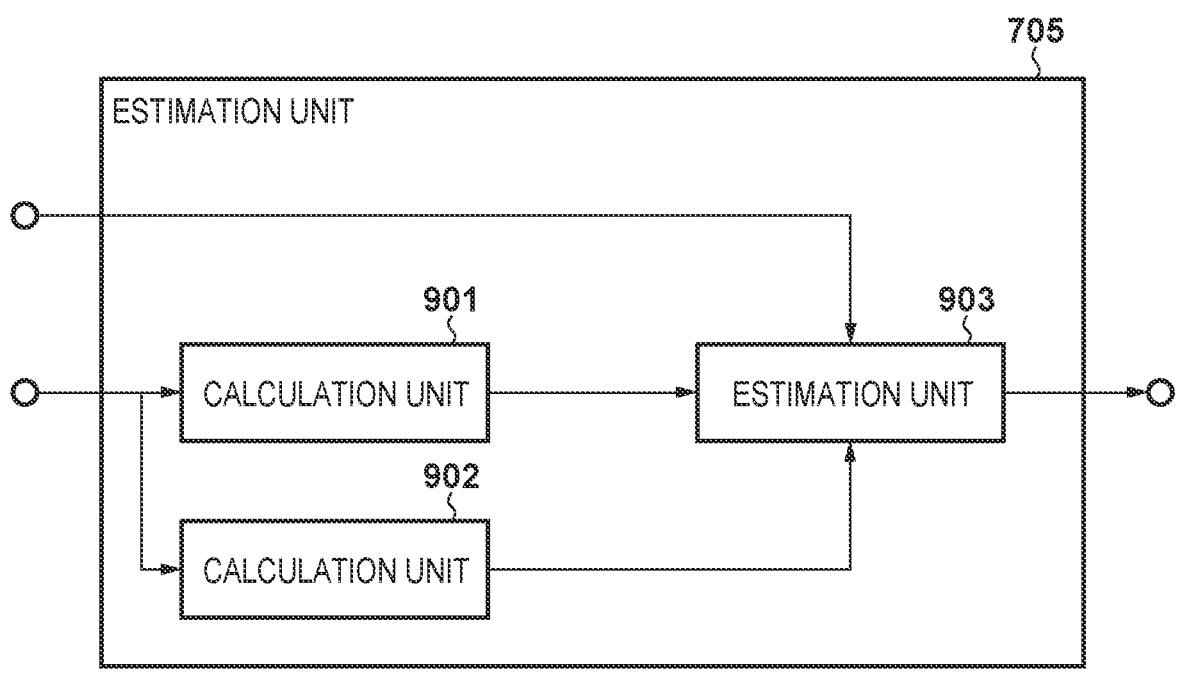
FIG. 9 is a block diagram illustrating details of an exemplary functional configuration example of an estimation unit 705.

An exemplary functional configuration of the processing of reducing color noise and coloring (false color) in a high frequency region of the image processing apparatus 100 according to the present embodiment is described using a block diagram of FIG. 6. An input image input from the imaging apparatus 105, the HDD 103, the external memory 107, or the like is inputted to a processing unit 601. The input image is the same as in the first embodiment.

The processing unit 601 applies patch-based noise reduction processing to the input image to generate a noise-reduced image, and outputs the generated noise-reduced image. Details of the patch-based noise reduction processing are described later.

A generation unit 603 generates, from the noise-reduced image outputted from the processing unit 601, hierarchical images reduced stepwise (hierarchically) with the reduction ratio of 1/2, 1/4, 1/8. Here, the hierarchical images mean a reduced image group constituting an image pyramid. The reduced images may be generated using a known reduction processing technique. However, at this time, the image is low-pass filtered and then reduced so as not to generate an alias, or is subjected to reduction processing in consideration of the alias. The depth of the hierarchy may be freely defined, and the present embodiment can be implemented if there is at least one reduced image. However, to maximize the effect, the hierarchy is desirably made as deep as possible to generate a plurality of reduced images. The reason is that the optimal reduction ratio for producing a coloring-suppressed signal varies depending on the target area and the subject around the target area. Note that instead of generating the hierarchical images from the noise-reduced image, the hierarchical images may be generated from the input image and then, the hierarchical images may be subjected to the noise reduction processing.

A second generation unit 604 generates a color difference signal for each hierarchical image (reduced image) generated by the generation unit 603. The method of generating the color difference signal is the same as the method of generating the color signal by the second generation unit 204.

A processing unit 605 generates a color difference signal coloring-suppressed based on the color difference signal generated by the second generation unit 604. Specifically, given that among the color difference signals generated by the second generation unit 604, the color difference signal having the highest reduction ratio is $Cr_{down}$ and $Cb_{down}$, and the color difference signal having the second highest reduction ratio (=the reduction ratio is smaller by one level) is $Cr_{up}$ and $Cb_{up}$, $Cr_{down}$ and $Cb_{down}$ are first expanded to have the same resolution as the $Cr_{up}$ and $Cb_{up}$. The enlarged color difference signal is referred to as $Cr_{down'}$ and $Cb_{down'}$. For example, a known technique such as bilinear interpolation may be used as the enlargement processing. Then, as represented by Equation (8) below, the magnitude cd of color difference is calculated for the enlarged $Cr_{down'}$, $Cb_{down'}$ and $Cr_{up}$, $Cb_{up}$. Here, the magnitude of the color difference is not necessarily calculated according to Equation (8), and may be calculated by the sum of absolute values rather than the sum of squares. Further, since the magnitude of the color difference corresponds to the magnitude of saturation, other methods of calculating the saturation may be used.

$$cd_{up} = cr_{up}^2 + Cb_{up}^2$$

$$cd'_{down} = cr_{down'}^2 + Cb_{down'}^2 \qquad (8)$$

Figure 14:
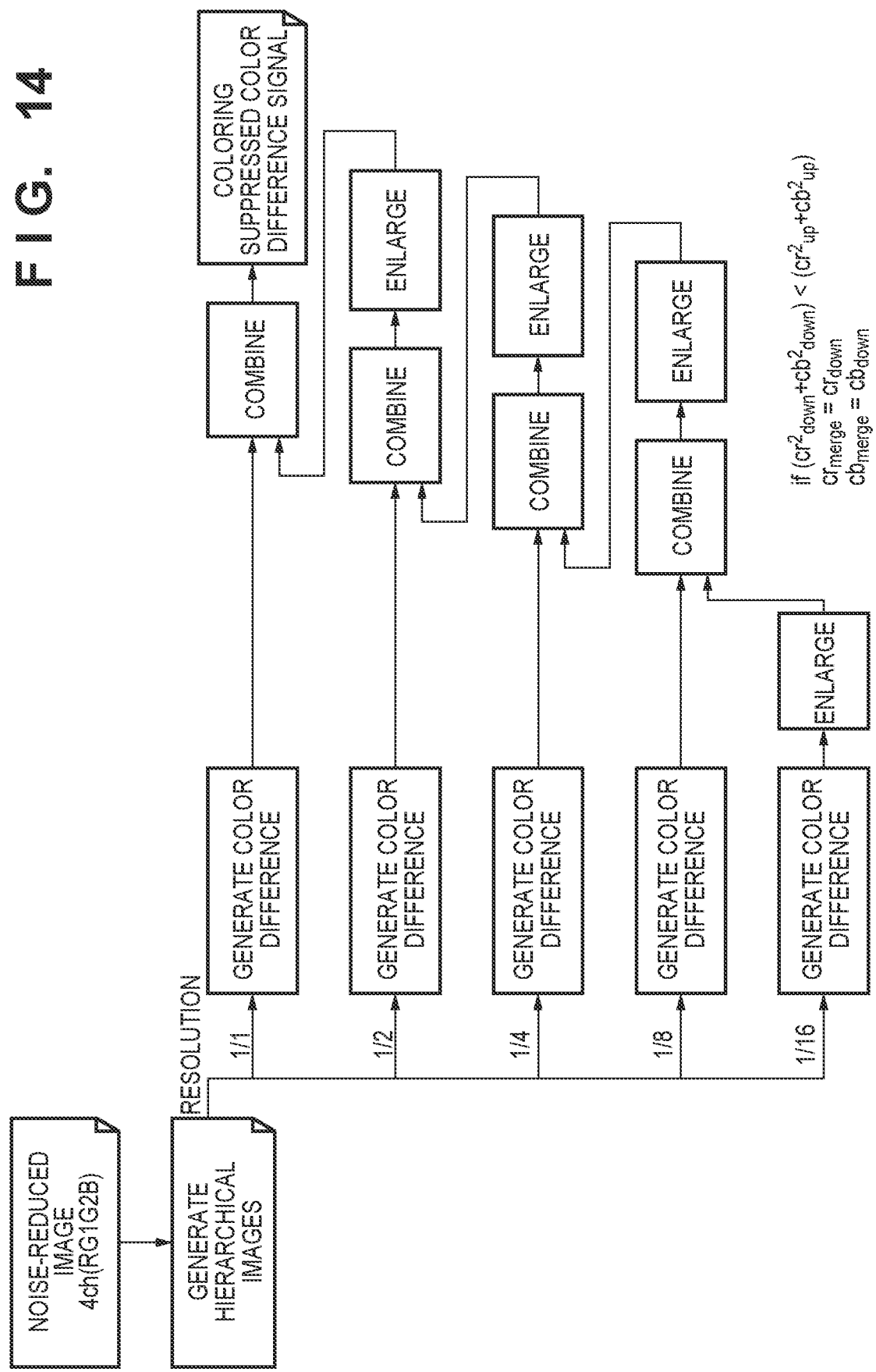
FIG. 14 is a schematic view illustrating the flow of processing of generating a coloring-suppressed color difference signal.

Then, $cd_{up}$ is compared with $cd_{down'}$, and the Cr and Cb signals corresponding to the smaller color difference magnitude is set as the combining result. Further, given that the combining result is $Cr'_{down}$ and $Cb'_{down}$ and the color difference signal having the next higher reduction ratio (=the reduction ratio is smaller by one level) is $Cr_{up}$ and $Cb_{up}$, the same process is sequentially repeated until combining with the color difference signal corresponding to the reduced image having the smallest reduction ratio is completed. Thereby, a coloring-suppressed color difference signal is generated. FIG. 14 is a schematic view illustrating the flow of processing of generating the coloring-suppressed color difference signal.

The combining unit 606 combines the color difference signal generated by the first generation unit 202 and the color difference signal generated by the processing unit 605 based on information about area to be coloring-suppressed. Specifically, the color difference signal generated by the first generation unit 202 may be replaced with the color difference signal generated by the processing unit 605 in only the area to be coloring-suppressed. For the information about area to be coloring-suppressed, for example, a known high frequency region detection technique may be used. In addition, a detection result of a false color/moire area may be used as the information about area to be coloring-suppressed. However, a more ideal combining result can be acquired by using similar patch information acquired by the processing unit 601 The reason is that the small number of similar patches mainly contribute to coloring (false color) occurring in a high frequency region. The similar patch information indicates how many patterns similar to the target area (patch) are present in the surroundings or in the entire image. In general, the similar patches are not found so much in a high frequency region and thus, a high frequency region detection result may be satisfactorily used. However, many similar patterns may be present even in a high frequency region. In a high frequency region where many similar patterns are present, noise can be reduced with high accuracy, and problematic coloring does not occur in the first place. Therefore, in such case, it is desirable that the color difference signals are combined based on the similar patch information rather than that the color difference signal is replaced with the coloring-suppressed color difference signal. Specifically, for example, the color difference signal generated by the first generation unit 202 may be replaced with the color difference signal generated by the processing unit 605 in only the area where the number of similar patches is smaller than a predetermined number. Also, it is conceivable to alpha-blend the color difference signal generated by the first generation unit 202 and the color difference signal generated by the processing unit 605 according to the number of similar patches. As a result, coloring can be successfully suppressed by satisfactorily blurring only the prominent colored portions without deteriorating the color resolution of the entire image. It is also conceivable to combine the similar patch information with the high-frequency region detection result, the color information, the edge determination result, etc. to acquire the information about area to be coloring-suppressed.

(Details of Processing Unit 601)

The processing unit 601 generates a noise-reduced input image (noise-reduced image) acquired by the patch-based noise reduction processing, and outputs the noise-reduced image. Next, an exemplary functional configuration of the processing unit 601 is described with reference to a block diagram in FIG. 7.

A pixel setting unit 701 generates a coordinate value designating an arbitrary pixel for input image data, and sets a target pixel and a plurality of reference pixels corresponding to the target pixel. A patch setting unit 702 sets a target patch and a plurality of reference patches based on the set target pixel and plurality of reference pixels.

A set generation unit 703 selects the reference patches (similar patches) having high similarity to the target patch from among the plurality of reference patches, to generate a similar patch image set. The set generation unit also holds information about similar patch. Details of the set generation unit 703 is described later.

An estimation unit 704 estimates a noise amount parameter of the target patch (similar image patch set). Details of the estimation of the noise amount parameter are described later. An estimation unit 705 models (assumes) a prior probability followed by ideal pixel value of the target patch (and the similar patch) without noise, based on the similar image patch set and the noise amount parameter estimated by the estimation unit 704. Details of prior probability estimation of the estimation unit 705 are described later.

A reduction processing unit 706 reduces noise of each patch constituting the similar image patch set. Details of the image patch noise reduction processing of the reduction processing unit 706 are described later. An image combining unit 707 combines (aggregates) the patches constituting the noise-reduced similar image patch set. Details of the image combining processing of the image combining unit 707 are described later.

(Details of Set Generation Unit 703)

The set generation unit 703 selects the reference patches having high similarity with the target patch from among the plurality of reference patches set by the patch setting unit 702, to generate a similar image patch set. Details of an exemplary functional configuration example of the set generation unit 703 are described with reference to the block diagram in FIG. 8.

A calculation unit 801 calculates, for each reference patch set by the patch setting unit 702, the similarity to the target patch. Specifically, given that I is the target patch and T is the reference patch, the similarity can be calculated according to Equations (9) and (10) below, for example. In addition, Equation (9) represents a sum of absolute differences (SAD) and Equation (10) represents a sum of squared differences (SSD). In Equations (9) and (10), it is assumed that the patch size is M×M, the pixel value at the pixel position (i, j) in one patch is I (i, j), and the pixel value at the pixel position (i, j) in the other patch is T (i, j).

$$R_{SAD} = \sum_{j=0}^{M-1} \sum_{i=0}^{M-1} |I(i,j) - T(i,j)| \qquad (9)$$

$$R_{SSD} = \sum_{j=0}^{M-1} \sum_{i=0}^{M-1} \{I(i,j) - T(i,j)\}^2 \qquad (10)$$

The similarity calculated by Equation (9) or (10) means that the smaller the value, the higher the similarity between the target patch and the reference patch. A selection unit 802 selects some of the reference patches based on the similarity calculated by the calculation unit 801, and generates a similar image patch set based on the target patch and the selected reference patches. At this time, the top N pieces having high similarity may be selected, or the reference patches satisfying a condition may be selected by comparing the similarity calculated by Equation (9) or (10) with a threshold. However, the number of patches constituting the similar image patch set has a great influence on modeling (assumption) of prior probability. For example, when the similar image patch set including the reference patches having low similarity is generated, the accuracy of the prior probability lowers. On the contrary, when the similar image patch set including only similar patches having high similarity are generated, in a case where the reference patches having high similarity is not enough, the noise reduction processing fails due to that the number of patches is insufficient (that is, does not reach a predetermined number). Thus, in the present embodiment, the method of selecting the top N pieces having high similarity is adopted. N is the number of pieces constituting the similar image patch set, and the numerical value of the parameter N for establishing the noise reduction processing and acquiring a desired result is previously determined according to the input image or the noise amount of the input image (for example, imaging sensitivity of the input image).

A holding unit 803 compares the similarity calculated by the calculation unit 801 with a threshold, and stores the number of reference patches that satisfy the condition in the RAM 102, the HDD 103, or the like. Specifically, the number of reference patches whose similarity is equal to or higher than the threshold is stored. This number of patches does not necessarily coincide with the number of patches constituting the similar image patch set selected by the selection unit 802. The information about the number of pieces held by the holding unit 803 means the number of patches that are truly similar to the target patch.

(Details of Noise Amount Parameter Estimation)

An estimation unit 704 estimates a noise amount parameter of the target patch (similar image patch set). In an imaging element (sensor) of a digital imaging apparatus, noise with the amount depending on the amount of incident light occurs. Precisely, since the noise model of the sensor also depends on temperature and exposure time, and there is a quadratic term of the light amount, exact modeling and parameter estimation are difficult. However, under most conditions, according to a simple first-order approximation as represented in Equation (11) below, the noise amount parameter can be estimated with practically sufficient accuracy for use in the noise reduction processing.

$$\sigma_I^2 = k(I - I_0) \qquad (11)$$

Here, $\sigma_1^2$ represents the noise amount corresponding to the pixel value of the input image, and k and $I_0$ represent noise characteristics of the sensor that captured the input image. The noise characteristic parameters are previously estimated, for example, by photographing and analyzing a chart for noise evaluation. Thereby, the noise amount parameters of the target patch can be estimated based on the pixel value of each pixel constituting the patch and the equation (11). The noise amount parameters of the target patch are represented by Equation (12) below, and $\sigma_1^2, \sigma_2^2, \ldots, \sigma_n^2$ each indicate the noise variance of each pixel constituting the patch. Note that $\Sigma$ is a diagonal matrix (components other than the diagonal components are 0), which means that the noise generated by the sensor is independent for each pixel, and noise can be represented by one scalar quantity $\sigma^2$ when the noise amount is constant.

$$\Sigma = \begin{bmatrix} \sigma_1^2 & & 0 \\ & \ddots & \\ 0 & & \sigma_n^2 \end{bmatrix} \qquad (12)$$

(Details of Prior Probability Estimation)

An estimation unit 705 models (assumes) a prior probability followed by ideal pixel value of the target patch (and the similar patch) without noise, based on the similar image patch set and the noise amount parameter estimated by the estimation unit 704. Details of an exemplary functional configuration of the estimation unit 705 is described with reference to a block diagram of FIG. 9.

Figure 15:
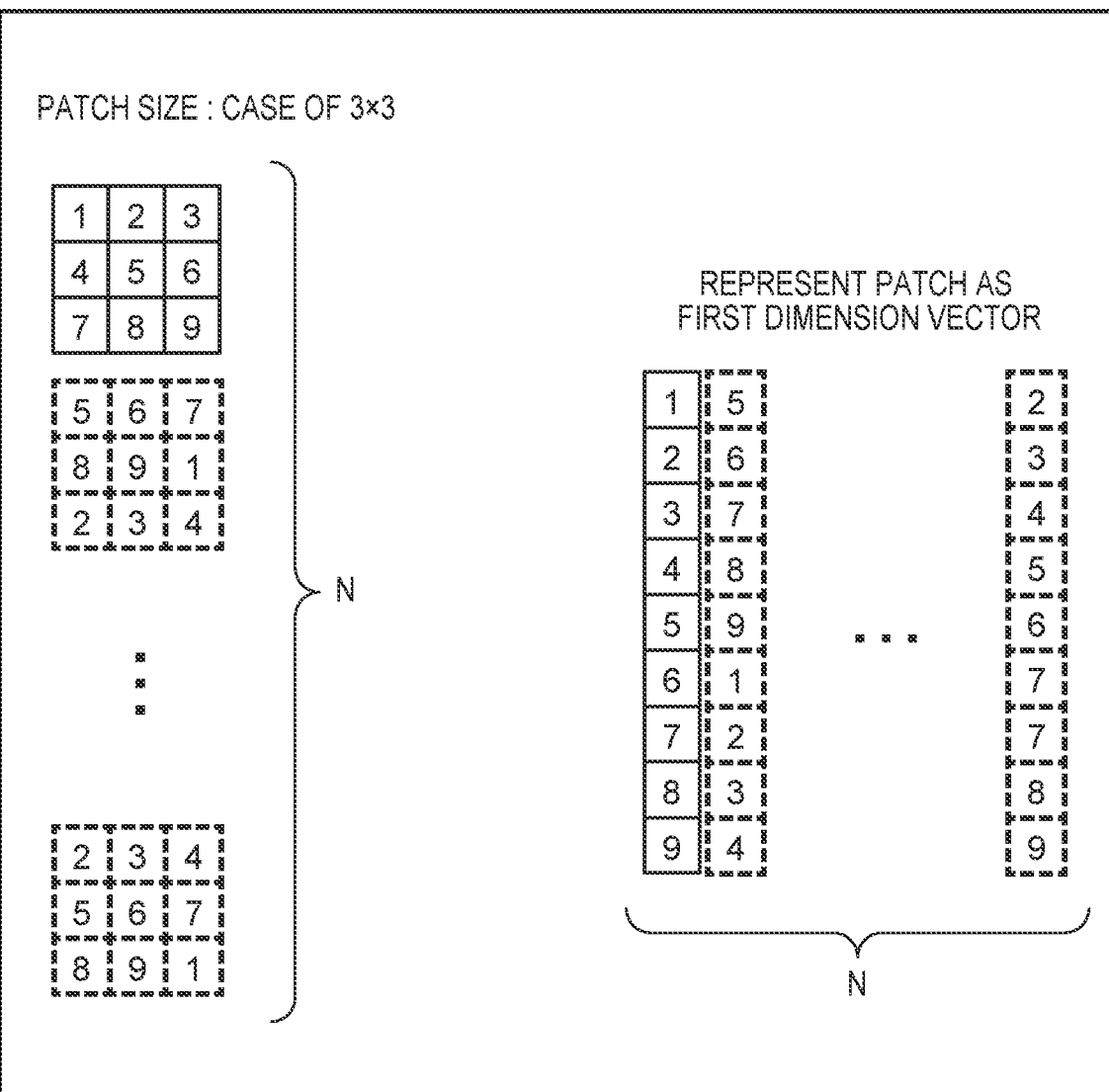
FIG. 15 is a view illustrating a patch.

A calculation unit 901 calculates an average value of pixel values for pixels constituting a patch in the similar image patch set. Here, for following matrix operation, it is assumed that patches are expressed and treated as vectors as illustrated in FIG. 15.

A calculation unit 902 calculates a variance-covariance matrix based on the similar image patch set. A mean vector and the variance covariance matrix can be calculated based on Equation (13) below, given that $\tilde{P}$ is the target patch, $\mathrm{Sim}\tilde{P}$ is the patches constituting the similar image patch set (the target patch and the image patches similar to the target patch), $\tilde{Q}$ is a column vector of each patch constituting the similar image patch set, $N_1$ is the number of patches constituting the similar image patch set, $\bar{P}$ is an average column vector of the similar image patch set, and $C_{\tilde{P}}$ is the variance-covariance matrix of the similar image patch set.

$$\forall \tilde{Q} \in Sim(\tilde{P}) \qquad (13)$$

$$\bar{P} \cong \frac{1}{N_1} \sum_{\tilde{Q} \in Sim(\tilde{P})} \tilde{Q}$$

$$C_{\tilde{P}} \cong \frac{1}{N_1 - 1} \sum_{\tilde{Q} \in Sim(\tilde{P})} (\tilde{Q} - \bar{P})(\tilde{Q} - \bar{P})^t$$

An estimation unit 903 estimates parameters of the prior probability model followed by the ideal pixel values of the target patch (and its similar patches) without noise. In the NL Bayes method, assuming that the similar image patch set (similar patch group) can be represented by a multidimensional normal distribution, the multidimensional normal distribution is used as the prior probability model. Therefore, the mean vector and the variance-covariance matrix, which are parameters representing the multidimensional normal distribution, are found. At this time, it should be noted that the parameters of the prior probability model must be estimated from the input image with noise. That is, the parameter of the prior probability model to be estimated is $\overline{P}, C_P$ and not $\tilde{\overline{P}}, C_{\tilde{P}}$ Thus, $\overline{P}, C_P$ is estimated from $\tilde{\overline{P}}, C_{\tilde{P}}$ that can be calculated from the input image according to the assumption in Equations (14) and (15) below. This can estimate the parameters representing the multidimensional normal distribution of the target patch (and its similar patches) followed by the ideal pixel value without noise.

$$C_{\tilde{P}} = C_P + \Sigma \quad (14)$$

$$\tilde{\overline{P}} = \overline{P} \quad (15)$$

(Details of Image Patch Noise Reduction Processing)

A reduction processing unit 706 reduces noise of each patch constituting the similar image patch set. In the NL Bayes method, using the Bayes' theorem represented by "posterior probability=likelihood×prior probability", the noise reduction result of each patch is found by determining the pixel value of the patch that maximizes the posterior probability. Specifically, the matrix operation in Equation (16) below may be performed based on the parameters obtained by Equation (13). Here, $Q^{1st}$ represents noise-reduced patches, and is found each patch $\tilde{Q}$ constituting a similar image patch set.

$$Q^{1st} = \overline{\tilde{P}} + [C_{\tilde{P}} - S_{\sigma^2}]C_{\tilde{P}}^{-1}(\tilde{Q} - \overline{\tilde{P}}) = \tilde{Q} - S_{\sigma^2}C_{\tilde{P}}^{-1}(\tilde{Q} - \overline{\tilde{P}}) \quad (16)$$

$$S_{\sigma^2} = \mathrm{diag}(\sigma_1^2, \sigma_2^2, \ldots, \sigma_{N_1}^2) = \begin{bmatrix} \sigma_1^2 & & & \\ & \sigma_2^2 & & \\ & & \ddots & \\ & & & \sigma_{N_1}^2 \end{bmatrix}$$

Note that the noise-reduced patch $Q^{1st}$ calculated by Equation (16) is a result of 1st STEP, and a result of 2nd STEP can be acquired with improved noise reduction accuracy by re-estimating the prior probability model using the result of 1st STEP.

(Details of Image Composition Processing)

Figure 10:
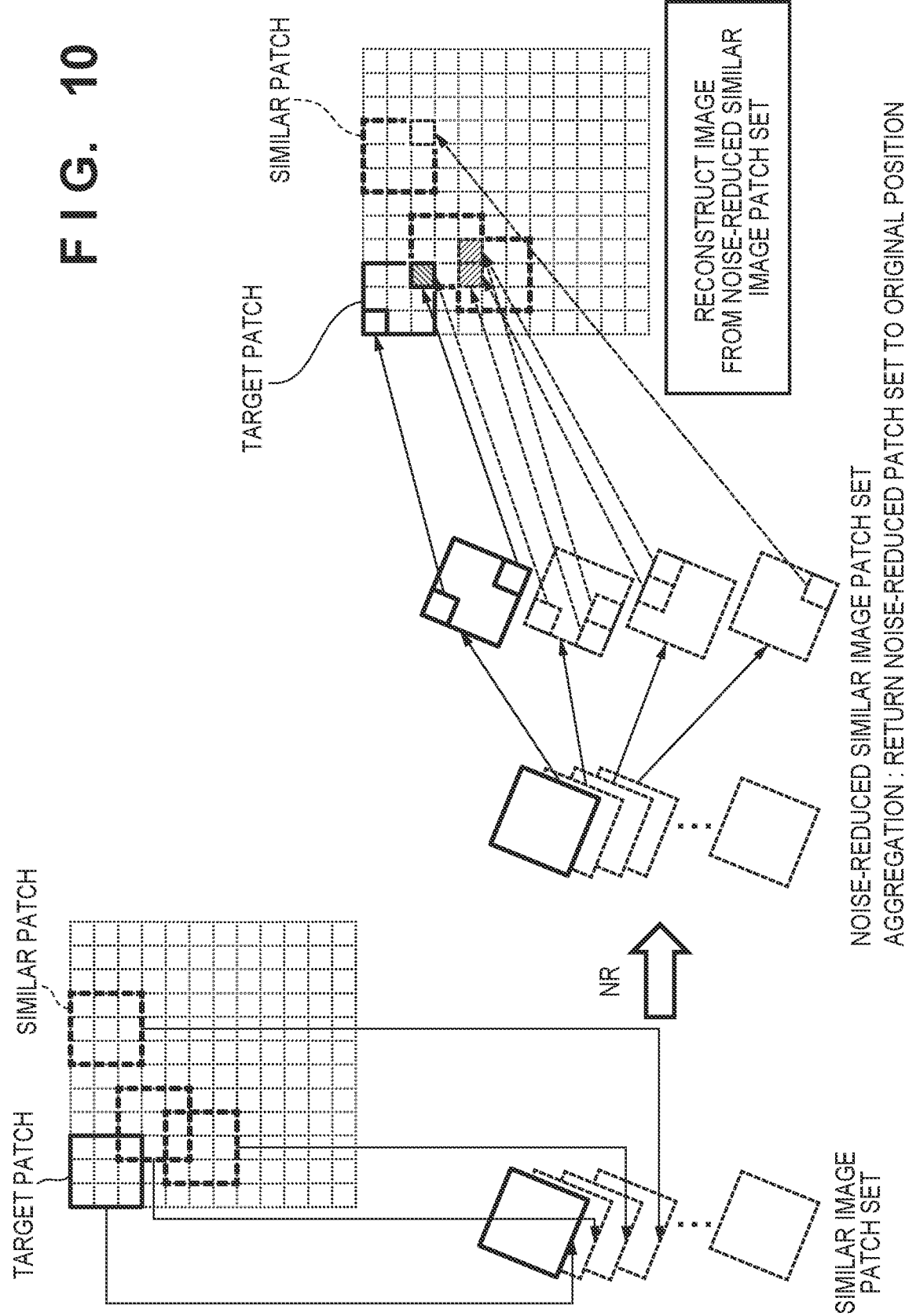
FIG. 10 is a diagram illustrating details of image combining processing.

An image combining unit 707 combines (aggregates) the patches constituting the noise-reduced similar image patch set. Specifically, each noise-reduced patch is returned to the original patch position, and pixels where a plurality of patches overlaps are averaged. The situation at this time is illustrated in FIG. 10. When a plurality of patches overlaps, a weighted average may be used, and for example, the similarity may be used as the weight. As described above, a noise-reduced image can be acquired.

(Main Processing Flow)

Figure 12:
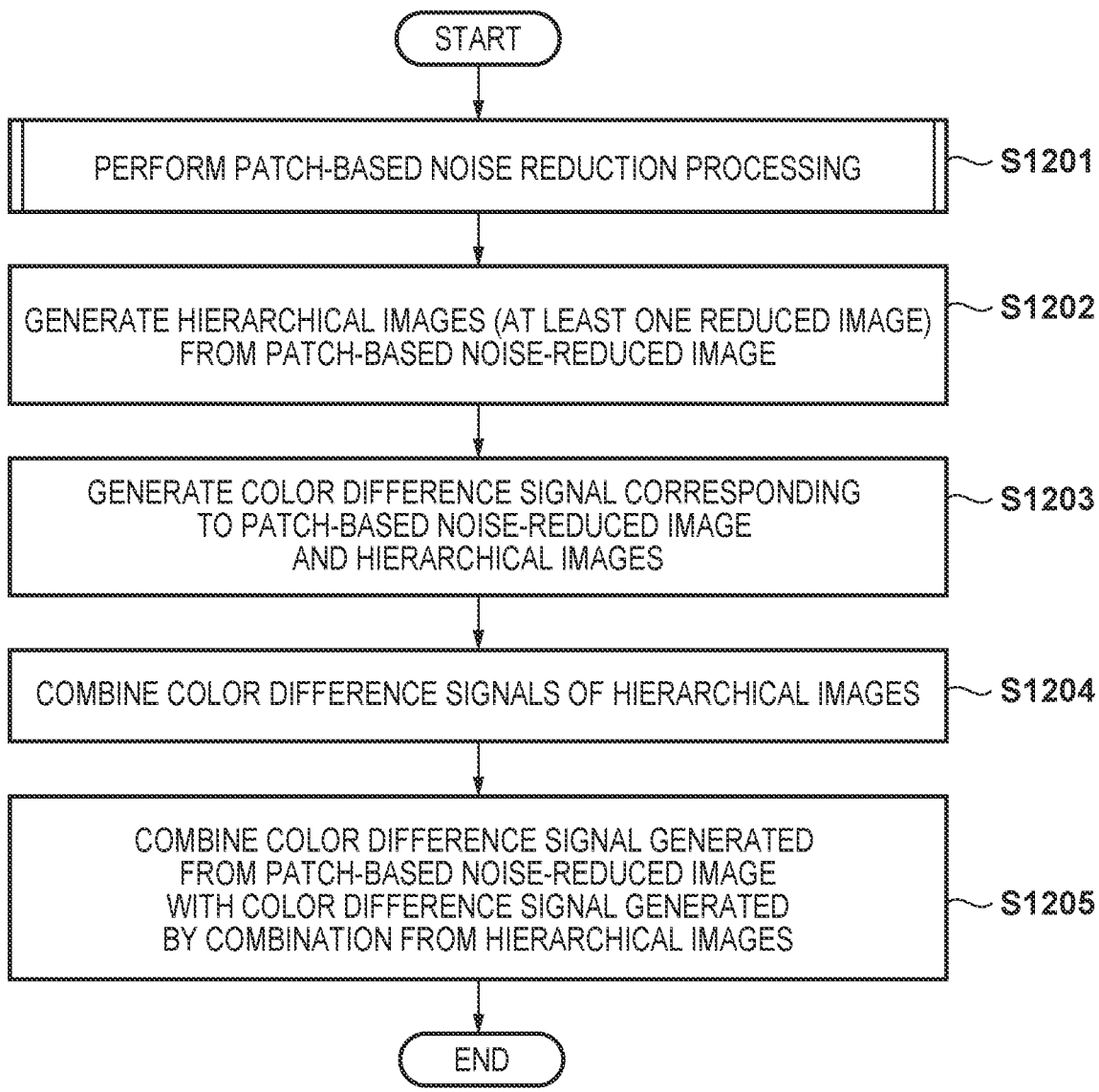
FIG. 12 is a flowchart of the processing of reducing color noise and coloring (false color) in a high frequency region.

Next, the processing of reducing color noise and coloring (false color) in a high frequency region of the image processing apparatus 100 is described with reference to a flowchart in FIG. 12. As described above, mainly the CPU 101 executes each processing step in the flowchart in FIG. 5.

In Step S1201, patch-based noise reduction processing is applied to an input image to generate a noise-reduced image and the generated noise-reduced image is outputted. Details of the patch-based noise reduction processing in Step S1201 are described later.

In Step S1202, hierarchical images having the previously defined number of layers are generated for the noise-reduced image outputted in Step S1201. In Step S1203, color difference signals of images corresponding to the noise-reduced image outputted in Step S1201 and the hierarchical images (respective reduced images) generated in Step S1202 are generated.

In Step S1204, the color difference signals corresponding to the hierarchical images (respective reduced images) generated in Step S1203 are combined to generate a coloring-suppressed color difference signal. In Step S1205, the color difference signal corresponding to the noise-reduced image generated in Step S1203 and the coloring-suppressed color difference signal generated in Step S1204 are combined based on similar patch information in the patch-based noise reduction processing of Step S1201. Specifically, the color difference signal corresponding to the noise-reduced image generated in Step S1203 is replaced with the color difference signal generated in Step S1204 in only the portion where the number of similar patches is small. The coloring generated in the image subjected to the patch-based noise reduction processing can be suppressed through the processing described above.

<Details of Patch-Based Noise Reduction Processing in Step S1201>

Figure 13:
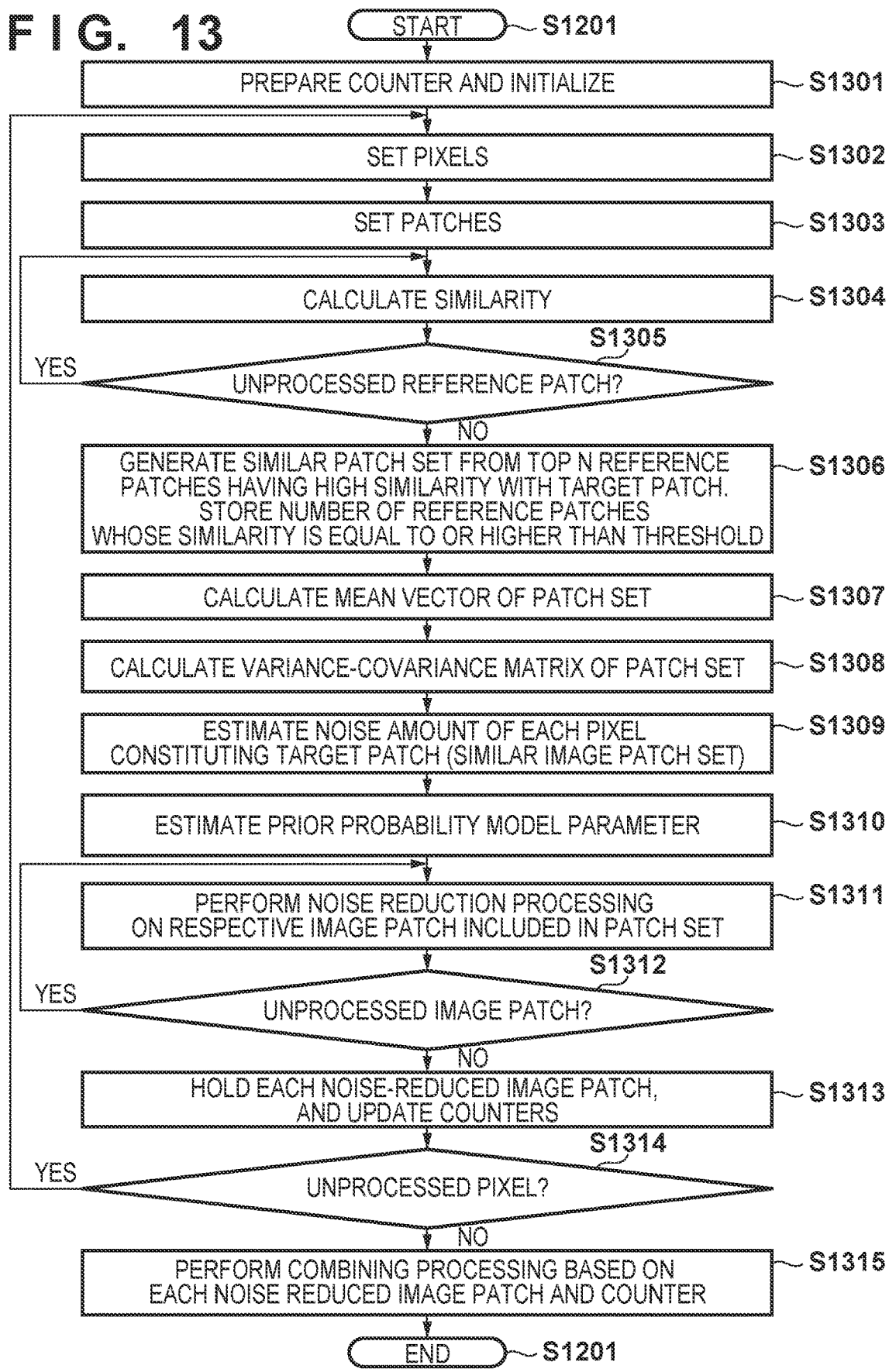
FIG. 13 is a flowchart illustrating details of processing in Step S1201.

Details of the processing in Step S1201 are described with reference to a flowchart of FIG. 13. In Step S1301, a memory (counter) of the data size of the input image is prepared in a memory such as the RAM 102 or the HDD 103. This counter is used to store how many times (how many) patches have been stacked in each pixel because a plurality of patches overlap at aggregation.

In Step S1302, coordinate values designating an arbitrary pixel are generated from the input image, and a target pixel and a plurality of reference pixels corresponding to the target pixel are set. The reference pixels are typically pixels located in the vicinity of the target pixel. Specifically, pixels included in a search range (rectangular area) around the target pixel are set. At this time, the computational complexity increases. However, generally, the performance is improved as the search range become larger. The reason is that more similar patches having high similarity to the target patch are collected by increasing the number of reference pixels.

In Step S1303, a target patch and a plurality of reference patches are set based on the target pixel and the plurality of reference pixels set in Step S1302. The optimum patch size varies depending on the noise amount of the input image and the subject area and is, for example, 3×3, 5×5, 7×7, etc.

Here, it is assumed that the patch size is set based on the noise characteristic of the sensor that captures the input image.

In Step S1304, one unprocessed reference patch is selected from the plurality of reference patches set in Step S1303. Then, the similarity between the target patch set in Step S1303 and the selected reference patch is calculated. To calculate the similarity, for example, the sum of squared differences or the sum of absolute differences of pixel values of the pixels constituting each patch is used.

In Step S1305, it is determined whether all of the plurality of reference patches set in Step S1303 have been selected. If there is any unselected reference patch, the processing returns to Step S1304 to determine a reference patch to be processed next. On the contrary, if the similarity of all the reference patches has been calculated, the processing proceeds to Step S1306.

In Step S1306, the top N reference patches having high similarity with the target patch are selected based on the similarity calculated in Step S1304, to generate a similar image patch set using the target patch and the selected reference patches. In addition, the number of reference patches whose similarity is equal to or higher than a threshold is stored. This number does not necessarily match the number of patches constituting the similar image patch set.

In Step S1307, a mean vector of the similar image patch set generated in Step S1306 is calculated. In Step S1308, a variance-covariance matrix of the similar image patch set generated in Step S1306 is calculated. A mean vector and the variance-covariance matrix are calculated according to Equation (13) above.

In Step S1309, the noise amount of each pixel constituting the target patch (similar image patch set) is estimated. Specifically, noise variance is calculated by substituting the pixel value of each pixel of the target patch into Equation (11), and is expressed as a noise amount parameter in Equation (12).

In Step S1310, a prior probability model is estimated based on the mean vector, the variance-covariance matrix, and the noise amount parameter. Here, it is assumed that the similar image patch set (similar patch group) can be modeled by multidimensional normal distribution without noise. Therefore, using the assumptions of Equations (14) and (15), the mean vector and variance covariance matrix without noise are estimated from the mean vector and variance covariance matrix that are calculated based on the input image with noise.

In Step S1311, one unprocessed patch is selected from the patches constituting the similar image patch set. Then, for the selected patch, noise is reduced based on the matrix operation of Equation (16).

In Step S1312, it is determined whether all patches have been processed. If there is any unprocessed patch, the processing returns to Step S1311 to determine a patch to be processed next. On the contrary, if noise of all patches has been completed, the processing proceeds to Step S1313.

In Step S1313, all noise-reduced patches are held, and counters corresponding to pixel positions of the respective patches in the input image are updated. In Step S1314, it is determined whether all the pixels of the input image have been set as the target pixel in Step S1302. If there is any unset target pixel, the processing returns to Step S1302 to set a target pixel to be processed next. On the contrary, if all the pixels are set as the target pixel, the processing proceeds to Step S1315. At this time, all the pixels of the input image are not necessarily set as the target pixel. For example, a patch used even once as the similar image patch set may not be set as the target patch. In this manner, in general, the processing can be significantly speeded up without significantly affecting the noise reduction effect.

Figure 11:
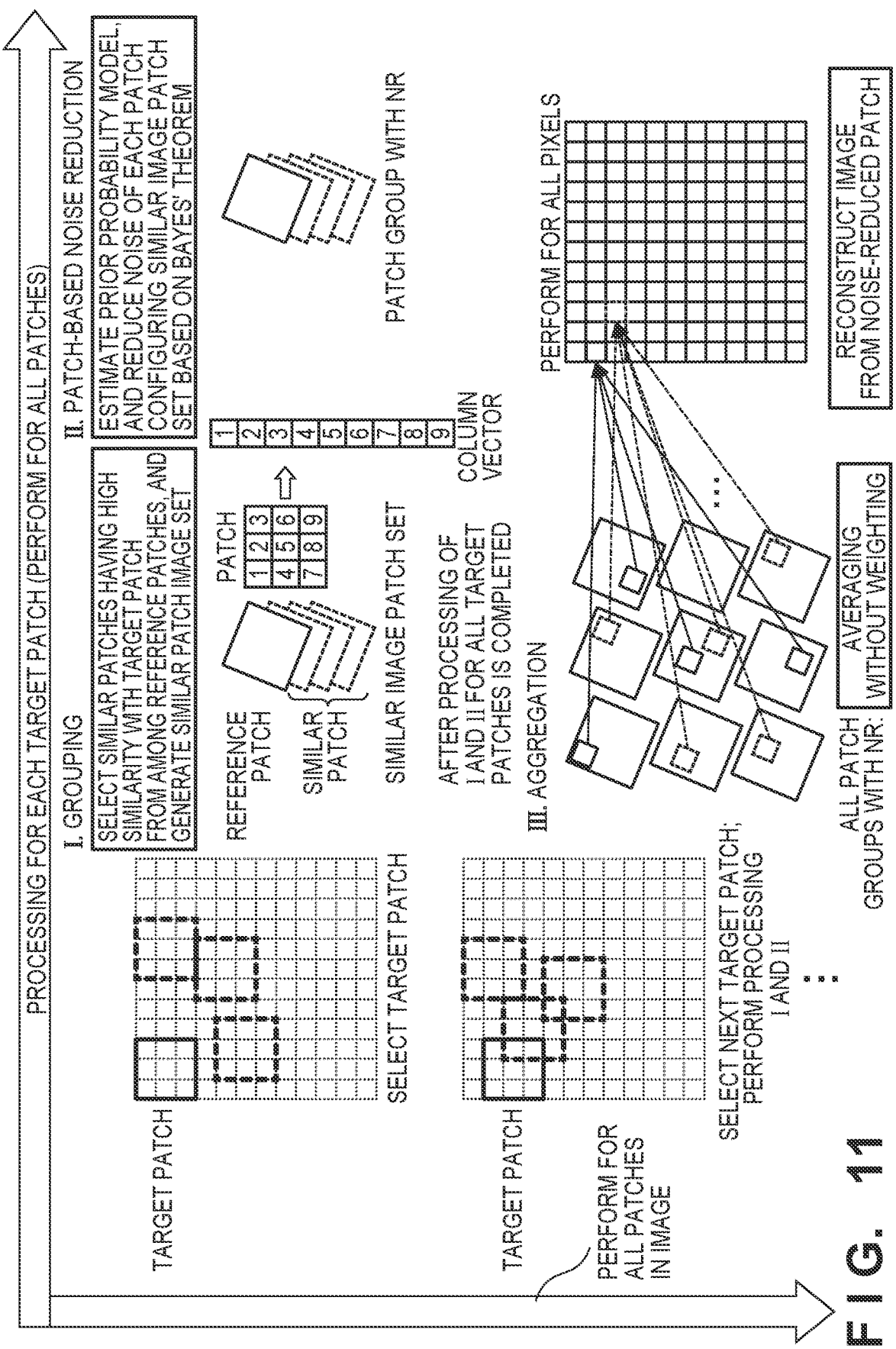
FIG. 11 is a diagram illustrating a rough flow of a series of the noise reduction processing.

In Step S1315, aggregation is performed based on all the noise-reduced similar image patch sets held in Step S1313 and the counter. After aggregation, a noise-reduced image is generated to complete the processing. A rough flow of the series of noise reduction processing is illustrated in FIG. 11.

As described above, according to the present embodiment, coloring (false color) generated in the noise-reduced image subjected to the highly accurate noise reduction processing can be suppressed more effectively. As a result, an image with color noise and coloring (false color) mainly in a high frequency region reduced more effectively can be acquired without deteriorating the color resolution of the entire image.

Third Embodiment

In the first and second embodiments, the processing is executed on the image processing application. However, the processing may be executed on the image processing hardware in the imaging apparatus for an image captured by the imaging apparatus. Also, an image may be transmitted from a client apparatus to an image processing application on a server apparatus, and the image may be processed on the server apparatus as in the above embodiments.

Further, some or all of the embodiments described above may be used in combination as appropriate. Further, some or all of the embodiments described above may be used in a selective manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-193515, filed Oct. 12, 2018, which is hereby incorporated by reference herein in its entirety.

What is claimed is:

1. An image processing apparatus comprising:
one or more processors; and
at least one memory coupled to the one or more processors and having stored thereon instructions, which when executed by the one or more processors, cause the image processing apparatus to function as:
a noise reduction unit configured to reduce color noise of an input image to generate a noise-reduced image;
a first generation unit configured to generate a color difference signal from the noise-reduced image;
a reduction processing unit configured to generate hierarchical images including at least two or more reduced images from the noise-reduced image;
a second generation unit configured to generate coloring-suppressed color difference signals from the reduced images; and
a combining unit configured to combine the color difference signal generated by the first generation unit with each of the color difference signals generated by the second generation unit, wherein
for each pixel in a reduced image in the hierarchy, the second generation unit, iteratively through the hierarchical images, selects as its color difference signal one of the color difference signals of said reduced image and of another reduced image expanded to the resolution of said reduced image, at the same location as said pixel, based on a magnitude that is a function of the respective color difference signals, to generate the coloring-suppressed color difference signals, and
wherein said another reduced image is adjacent to said reduced image in the hierarchy and of a lower resolution.

2. The image processing apparatus according to claim 1, wherein the combining unit combines the color difference signal generated by the first generation unit with each of the color difference signals generated by the second generation unit based on information about area to be coloring-suppressed.

3. The image processing apparatus according to claim 2, wherein said information is frequency of an area and the combining unit replaces the color difference signal generated by the first generation unit with each of the color difference signals generated by the second generation unit only in a high frequency region.

4. The image processing apparatus according to claim 1, wherein the first generation unit uses three types of signals including two types of signals corresponding to G1 and G2 in Bayer arrangement and an average value of the two types of signals as G signals of the noise-reduced image, to generate a color difference signal having a minimum color difference magnitude among a plurality of values generated using G1 and G2.

5. The image processing apparatus according to claim 1, wherein the second generation unit includes uses three types of signals including two types of signals corresponding to G1 and G2 in Bayer arrangement and an average value of the two types of signals as G signals of each of the reduced images generated by the reduction processing unit, to generate a color difference signal having a minimum color difference magnitude among a plurality of values generated using G1 and G2.

6. The image processing apparatus according to claim 5, wherein the second generation unit compares the color difference signal having the minimum magnitude with a color difference signal calculated using the average value of the G1 and G2, and when signs of the two color difference signals are inverted, the color difference is set to 0.

7. The image processing apparatus according to claim 1, wherein the noise reduction unit includes:
a unit configured to set a target pixel and a plurality of reference pixels for the target pixel among pixels constituting the input image;
a unit configured to set a target patch constituted of a plurality of pixels based on the target pixel, and a plurality of reference patches constituted of a plurality of pixels based on each of the plurality of reference pixels;
a set generation unit configured to select patches from the plurality of reference patches, and generate a similar image patch set comprising the target patch and the selected patch;
a unit configured to estimate prior probability based on the similar image patch set;
a processing unit configured to estimate a noise-reduced patch of each of patches constituting the similar image patch set based on the similar image patch set and the prior probability; and
a unit configured to apply image combining processing to the noise-reduced patches estimated by the processing unit to generate the noise-reduced image.

8. The image processing apparatus according to claim 7, wherein the set generation unit includes:
a unit configured to calculate similarity between the target patch and the plurality of reference patches;
a holding unit configured to hold information about reference patches in a memory among the plurality of reference patches based on the respective calculated similarity of the reference patches; and
a selection unit configured to perform said reference patch selection based on the respective calculated similarity of the reference patches.

9. The image processing apparatus according to claim 8, wherein the holding unit holds information about a reference patch whose calculated similarity is equal to or more than a threshold in the memory.

10. The image processing apparatus according to claim 8, wherein the selection unit selects the top N reference patches according to their respective calculated similarity as reference patches to be included in the similar image patch set, wherein N is a predetermined number.

11. The image processing apparatus according to claim 8, wherein the combining unit combines the color difference signal generated by the first generation unit with each of the color difference signals generated by the second generation unit based on similar patch information indicating how many patterns similar to the target patch are present in surroundings or the entire image.

12. The image processing apparatus according to claim 1, wherein the magnitude of a pixel is saturation of the color difference signal of the pixel and the color difference signals with the smaller magnitude is selected, and wherein the second generation unit iterates sequentially through the hierarchical images by starting from the reduced image with the highest reduction ratio until the reduced image having the smallest reduction ratio is processed.

13. The image processing apparatus according to claim 1, wherein the reduction processing unit generates a plurality of reduced images having different reduction ratios.

14. The image processing apparatus according to claim 1, wherein the input image is an image configured of R, G, and B components.

15. An image processing method comprising:
- reducing color noise of an input image to generate a noise-reduced image;
- performing a first generation to generate a color difference signal from the noise-reduced image;
- generating hierarchical images including at least two or more reduced images from the noise-reduced image;
- performing a second generation to generate coloring-suppressed color difference signals from the reduced images; and
- combining the color difference signal generated in the first generation and each of the color difference signals generated in the second generation, wherein
- in the second generation, for each pixel in a reduced image in the hierarchy, iteratively through the hierarchical images, selects as its color difference signal one of the color difference signals of said reduced image and of another reduced image expanded to the resolution of said reduced image, at the same location as said pixel, based on a magnitude that is a function of the respective color difference signals, to generate the coloring-suppressed color difference signals, and
- wherein said another reduced image is adjacent to said reduced image in the hierarchy and of a lower resolution.

16. A non-transitory computer-readable storage medium storing a computer program that causes a computer to function as:
- a noise reduction unit configured to reduce color noise of an input image to generate a noise-reduced image;
- a first generation unit configured to generate a color difference signal from the noise-reduced image;
- a reduction processing unit configured to generate hierarchical images including at least two or more reduced images from the noise-reduced image;
- a second generation unit that generates coloring-suppressed color difference signals from the reduced images; and
- a combining unit configured to combine the color difference signal generated by the first generation unit with each of the color difference signals generated by the second generation unit, wherein
- for each pixel in a reduced image in the hierarchy, the second generation unit, iteratively through the hierarchical images, selects as its color difference signal one of the color difference signals of said reduced image and of another reduced image expanded to the resolution of said reduced image, at the same location as said pixel, based on a magnitude that is a function of the respective color difference signals, to generate the coloring-suppressed color difference signals, and
- wherein said another reduced image is adjacent to said reduced image in the hierarchy and of a lower resolution.

* * * * *